Figure 1:
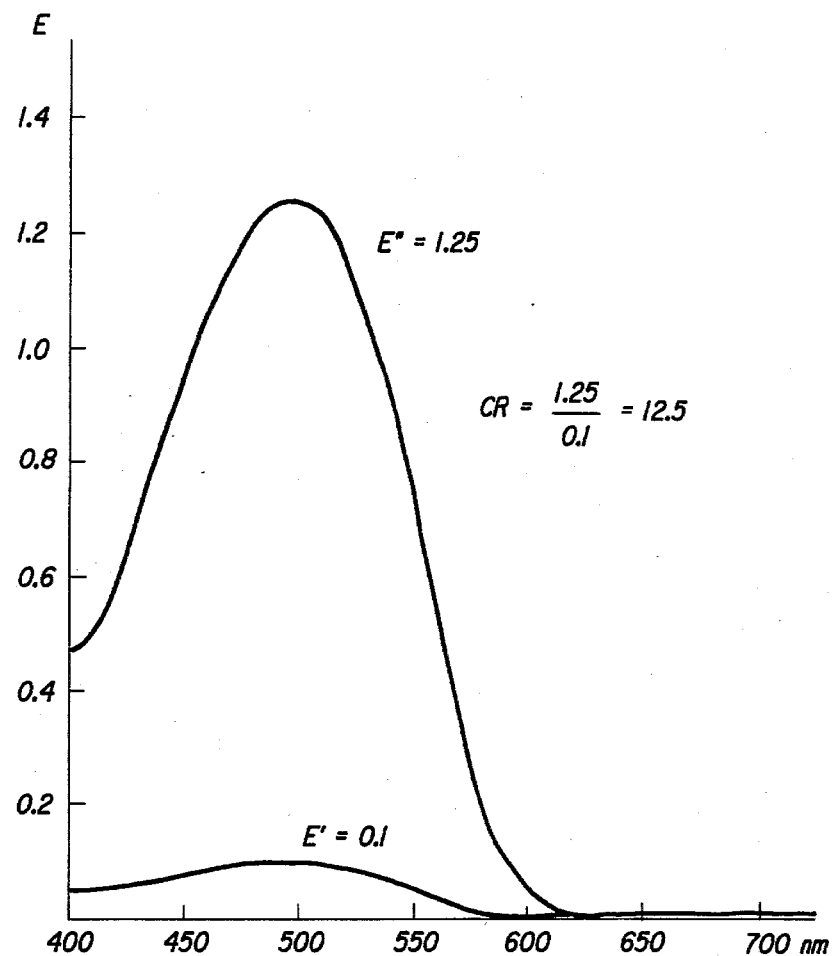

United States Patent [19]

Etzbach et al.

[11] Patent Number: 4,667,019
[45] Date of Patent: May 19, 1987

[54] AZO DYES CONTAINING A TRIAZOLYL GROUP FOR USE IN LIQUID CRYSTALLINE MATERIALS

[75] Inventors: Karl-Heinz Etzbach, Frankenthal; Peter Neumann, Wiesloch, both of Fed. Rep. of Germany

[73] Assignee: BASF Aktiengesellschaft, Ludwigshafen, Fed. Rep. of

[21] Appl. No.: 818,075

[22] Filed: Jan. 13, 1986

Related U.S. Application Data

[63] Continuation of Ser. No. 627,529, Jul. 3, 1984, abandoned.

[51] Int. Cl.$^4$ .................. C09B 29/036; C09B 31/14; C09B 31/28; C09K 19/34
[52] U.S. Cl. .......................... 534/577; 252/299.1; 252/299.61; 252/299.68; 534/573; 534/649; 534/796; 534/797; 534/799; 534/775; 534/752; 534/771
[58] Field of Search ............... 534/797, 799, 771, 775, 534/752, 577, 796, 573 L, 649

[56] References Cited

U.S. PATENT DOCUMENTS

| | | | |
|---|---|---|---|
| 2,817,659 | 12/1957 | Bossard et al. | 534/797 X |
| 2,932,636 | 4/1960 | Suckfull et al. | 534/797 X |
| 3,084,151 | 4/1963 | Gross et al. | 534/797 X |
| 3,099,651 | 7/1963 | Gross et al. | 534/797 X |
| 3,116,277 | 12/1963 | Gross et al. | 534/797 X |
| 3,148,179 | 9/1964 | Carboni | 534/797 X |
| 3,501,454 | 3/1970 | Nickel et al. | 534/797 X |
| 3,519,615 | 7/1970 | Wolfrum et al. | 534/797 X |

FOREIGN PATENT DOCUMENTS 2478833  2/1982  France ...................... 534/797

OTHER PUBLICATIONS

European Search Report for EP 84 10 7753.

*Primary Examiner*—Floyd D. Higel
*Attorney, Agent or Firm*—Oblon, Fisher, Spivak, McClelland & Maier

[57] ABSTRACT

Compounds of the general formula I

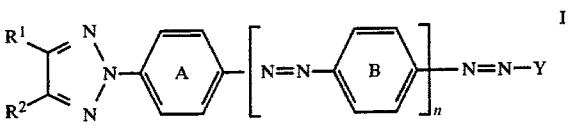

where n is 0, 1 or 2, $R^1$ and $R^2$ are each hydrogen, unsubstituted or substituted alkyl, cycloalkyl, aralkyl, aryl, acyl, alkoxycarbonyl or aryloxycarbonyl, or together form alkylene or an unsubstituted or substituted benzo ring and Y is a radical of the formula

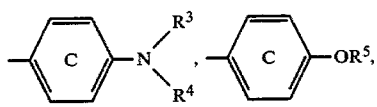

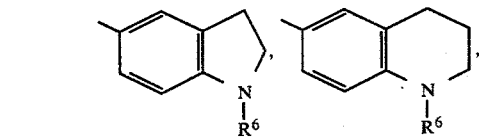

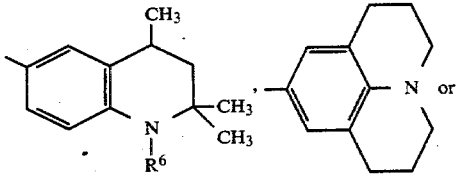

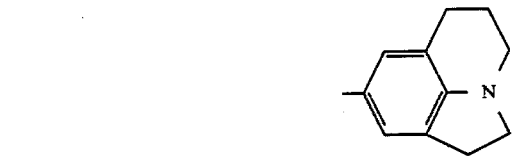

where the rings A, B and C can be further substituted or benzo-fused, $R^3$ and $R^4$ are each hydrogen or unsubstituted or substituted alkyl, aralkyl or cycloalkyl, or, (Abstract continued on next page)

together with the nitrogen, form piperidino, pyrrolidino or morpholino, $R^5$ is hydrogen, unsubstituted or substituted alkyl, cycloalkyl, aralkyl, acyl, alkoxycarbonyl, aryloxycarbonyl, alkylsulfonyl, or arylsulfonyl and $R^6$ is hydrogen, alkyl or cycloalkyl. These compounds are useful as pleochroic dyes and have a good degree of order coupled with high solubility and good stability in the liquid crystal matrix.

2 Claims, 4 Drawing Figures

AZO DYES CONTAINING A TRIAZOLYL GROUP FOR USE IN LIQUID CRYSTALLINE MATERIALS

This application is a continuation of application Ser. No. 627,529, filed July 3, 1984, now abandoned.

BACKGROUND OF THE INVENTION

1. Field of the Invention

The present invention relates to compounds of the general formula I

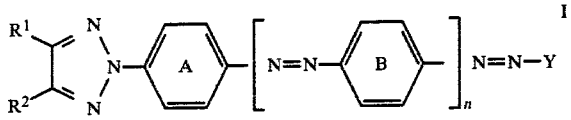

where n is 0, 1 or 2, $R^1$ and $R^2$ are each hydrogen, unsubstituted or substituted alkyl, cycloalkyl, aralkyl, aryl, acyl, alkoxycarbonyl or aryloxycarbonyl, or together form alkylene or an unsubstituted or substituted benzo ring and Y is a radical of the formula

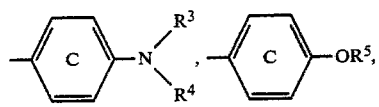

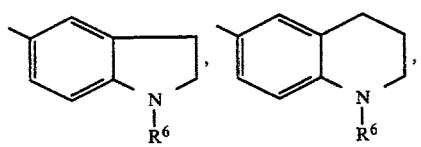

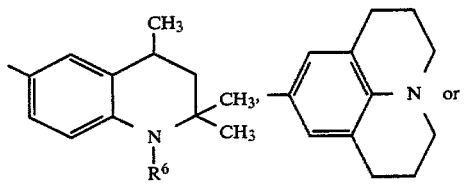

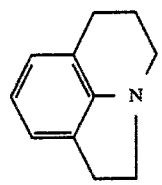

where the rings A, B and C can be further substituted or benzo-fused, $R^3$ and $R^4$ are each hydrogen or unsubstituted or substituted alkyl, aralkyl or cycloalkyl, or, together with the nitrogen, form piperidino, pyrrolidion or morpholine, $R^5$ is hydrogen, unsubstituted or substituted alkyl, cycloalkyl, aralkyl, aryl, acyl, alkoxycarbonyl, aryloxycarbonyl, alkylsulfonyl or arylsulfonyl and $R^6$ is hydrogen, alkyl or cycloalkyl, and n is preferably 1.

2. Description of the Prior Art

The ring A can be further substituted by, for example, chlorine, brmine, cyano, methyl, ethyl, methoxy, ethoxy or hydroxyl.

Ring B and ring C can each be substituted by, for example, chlorine, bromine, methyl, ethyl, methoxy, ethoxy, acetylamino, propionylamino or a fused benzo ring.

$R^1$ and $R^2$ are each hydrogen or, for example, $C_1-C_4$-alkyl, cyclohexyl, cyclopentyl, benzyl, 2-phenylethyl, 4-methylbenzyl, or phenyl which is unsubstituted or substituted by methyl, ethyl, propyl or butyl, or are each acetyl, benzoyl, $C_1-C_{12}$-alkoxycarbonyl or phenoxycarbonyl, or $R^1$ and $R^2$ together form, for example, trimethylene, tetramethylene or

where R is hydrogen, $C_1-C_{12}$-alkyl, cyclopentyl, cyclohexyl, cycloheptyl, nitro, cyano, chlorine, bromine, hydroxyl, $C_1-C_{12}$-alkoxy, benzyloxy, amino, $C_1-C_4$-dialkylamino or $C_1-C_{12}$-alkoxycarbonyl and m is 1 or 2.

Specific examples of radicals R, in addition to those stated above, are methyl, ethyl, propyl, butyl, nonyl, methoxy, ethoxy, butoxy, dimethylamino, diethylamino, dibutylamino, methoxycarbonyl, ethoxycarbonyl and butoxycarbonyl.

$R^3$ and $R^4$ are hydrogen or, for example, methyl, ethyl, butyl, pentyl, hexyl, octyl, cyclohexyl, 2-phenylethyl, 2-cyanoethyl, 2-hydroxyethyl, 2-acetoxyethyl, allyl, benzyl or 4-butylbenzyl.

Specific examples of $R^5$ are hydrogen, methyl, ethyl, propyl, butyl, hexyl, heptyl, nonyl, cyclohexyl, benzyl, 4-cyclohexylbenzyl, 4-(4'-butylcyclohexyl)-benzyl, 4-butylbenzyl, phenyl, 4-butylphenyl, acetyl, propionyl, butyryl, benzoyl, 4-cyclohexylbenzoyl, 4-(4'-butylcyclohexyl)-benzoyl, 4-butylbenzoyl, ethoxycarbonyl, phenoxycarbonyl, butylsulfonyl, phenylsulfonyl and 4-methylphenylsulfonyl.

Alkyl radicals $R^6$ are, for example, hydrogen, methyl, ethyl, butyl or cyclohexyl.

The compounds of the formula I are particularly useful as pleochroic dyes in electro-optical liquid crystal displays of the guest-host type.

Liquid-crystalline materials which contain pleochroic dyes are used in displays. The use according to the invention is based on known principles, which are described in, for example, H. Kelker and R. Hatz, Handbook of Liquid Crystals (1980), page 611 et seq., R. J. Cox, Mol. Cryst. Liq. Cryst. 55 (1979), 51 et seq, and L. Pauls and G. Schwarz, Elektronik 14 (1982), 66 et seq. Further literature which gives a detailed description of the use according to the invention is referred to in the stated publications.

Dyes for liquid crystal mixtures have to meet a number of requirements (cf. for example J. Constant et al., J. Phys. D: Appl. Phys. 11 (1978), 479 et seq., F. Jones and T. J. Reeve, Mol. Cryst. Liq. Cryst. 60 (1980), 99 et seq., EP 43904, EP 55838 and EP 65869). They must not undergo ionization in an electric field, must have a very high molar extinction coefficient ε and be highly soluble in the liquid crystal matrix used and chemically and, in particular, photochemically stable, and, in order to achieve good contrast in the guest-host displays, must have a degree of order S which is preferably higher than 0.75 in the particular nematic phase.

Dyes which meet these requirements are predominantly those from the class comprising the anthraquinones (cf. for example EP 56492, EP 44893, EP 59036 and EP 54217). To date, the particular disadvantage of azo dyes has been that they are either not sufficiently soluble or not sufficiently light-stable.

Surprisingly, the dyes according to the invention possess a good degree of order coupled with high solubilities and good light-stabilities in the particular liquid crystal matrix.

The preparation of the appropriate 2-(4'-aminophenyl)-triazoles is known, eg. coupling of p-nitroaniline to ethyl acetoacetate (C. Kjellin, Chem. Ber. 30 (1897), 1965), oxidative cyclization with copper(II) chloride in the presence of ammonium chloride (T. L. Gilchrist et al., Adv. in Heterocyclic Chem. 16 (1974), 60), and reduction of the nitro group (H. v. Pechmann et al., Chem. Ber 42 (1909) 659).

The preparation of the appropriate benzotriazoles by oxidative or reductive cyclization of the o-amino- or nitroazo compound is described in U.S. Pat. No. 2,501,188 and J. Cepcianski and J. Majer, Collect. Czech. Chem. Commun. 34 (1969), 72.

The compounds of Examples 1 and 2 are prepared by diazotization of the 2-(4'-aminophenyl)-1,2,3-triazoles with nitrosylsulfuric acid in glacial acetic acid/propionic acid, followed by coupling of the product to the appropriate aniline. In Examples 3-17, coupling to the particular aniline possessing a free $NH_2$ group is carried out in a similar manner, after which diazotization with nitrosylsulfuric acid in glacial acetic acid/propionic acid is once again carried out and the product is then coupled to the appropriately substituted aniline (in Examples 3-15 and 19-32) or to m-cresol (in Examples 16, 17 and 18). The dyes of Examples 16, 17 and 18 are prepared by alkylation of the phenolic OH group with butyl bromide or the appropriate benzyl bromide in dimethylformamide in the presence of potassium carbonate at 100° C.

The dyes are purified by chromatography over silica gel, using a toluene/ethyl acetate mixture as the mobile phase, and are then recrystallized from toluene. The purity is checked by means of thin-layer chromatography and elemental analysis.

Typical methods of preparation are described in Examples 1 and 10 below. Parts and percentages are by weight, unless stated otherwise.

Particularly important compounds are those of the formula Ia

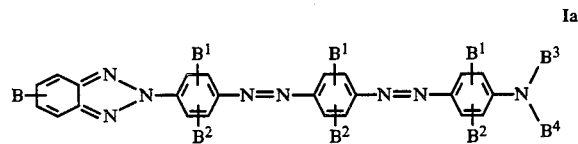

where B is hydrogen, $C_1$-$C_4$-alkyl, cyclohexyl, $C_1$-$C_9$-alkoxycarbonyl, nitro or cyano, $B^1$ and $B^2$ independently of one another are each hydrogen or methyl, and $B^3$ and $B^4$ independently of one another are each hydrogen, $C_1$-$C_8$-alkyl, benzyl or cyclohexyl, or, together with the nitrogen, form pyrrolidino, piperidino or morpholino.

General Methods of Preparation

EXAMPLE 1

160 parts of an about 17% strength nitrosylsulfuric acid were added dropwise to a mixture of 37.6 parts of 2-(4'-aminophenyl)-4,5-dimethyl-1,2,3-triazole, 200 parts of glacial acetic acid and 200 parts of propionic acid at 5° C., and, when the addition was complete, stirring was continued for a further hour at 5° C. A solution of 32.6 parts of N-phenylmorpholine in 100 parts of glacial acetic acid was added to this mixture, while cooling, and the pH was then brought to 5-6 by adding a saturated aqueous sodium acetate solution. The mixture was then stirred overnight at room temperature, and the resulting precipitate was filtered off under suction, washed with water and dried to give 52 parts of a dye, which was purified by recrystallizing it twice from toluene. Melting point: 289° C.

EXAMPLE 10

20 parts of 2-(4'-aminophenyl)-5-methyl-1,2,3-benzotriazole were suspended in 100 parts of glacial acetic acid and 100 parts of propionic acid, and were diazotized at 5° C. with 71 parts of an about 17% strength nitrosylsulfuric acid. The mixture was stirred for two hours at 5° C., after which the diazonium salt solution was poured into 1,000 parts of water, excess nitrite was destroyed by adding amidosulfonic acid, and the mixture was then filtered. The filtrate was added, while cooling with ice, to a solution of 11 parts of 2,5-dimethylaniline, 10 parts of concentrated hydrochloric acid, 200 parts of water and 200 parts of ice, the pH of the solution was brought to 1-1.5 with saturated aqueous sodium acetate solution, and the mixture was then stirred overnight at room temperature. The dye formed was filtered off under suction and washed first with water, then with saturated sodium acetate solution and then once again with water. The filtration residue was sucked thoroughly dry and then stirred in 400 parts of glacial acetic acid, after which 30 parts of a 23% strength sodium nitrite solution were added, followed by the addition of 40 parts of concentrated hydrochloric acid, both additions taking place at 5° C. The mixture was stirred for 3 hours at 5Z° C., after which the excess nitrite was destroyed with amidosulfonic acid, a solution of 11 parts of N,N-dimethylaniline in 10 parts of concentrated hydrochloric acid, 200 parts of water and 200 parts of ice was added to the diazonium salt suspension, and the mixture was then stirred overnight at room temperature. The red dye was filtered off under suction, washed with water and dried. Yield: 29 parts.

The dye was purified by chromatography over silica gel (MN-Kieselgel 60, 0.063-0.2 nm), using a 10:1 toluene/ethyl acetate mixture as the mobile phase. After the chromatographic purification, the dye was recrystallized from toluene. Melting point: 214° C.

| Example | | m.p. | λ max ($CH_2Cl_2$) |
|---|---|---|---|
| 1 | 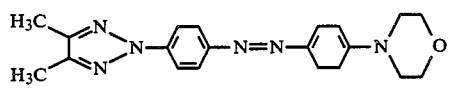 | 289° C. | |

-continued

| Example | Structure | m.p. | λ max (CH₂Cl₂) |
|---|---|---|---|
| 2 | (cyclohexane-fused triazine)−N=N−C₆H₄−N=N−C₆H₄−N(CH₃)₂ | 268° C. | 428 nm |
| 3 | (4,5-dimethyl-triazine)−N=N−C₆H₄−N=N−C₆H₄−N=N−C₆H₄−N(CH₃)₂ | 270° C. | 428 nm |
| 4 | (4,5-dimethyl-triazine)−C₆H₄−N=N−C₆H₃(OCH₃)−N=N−C₆H₄−N(CH₃)₂ | 230° C. | |
| 5 | (CO₂C₂H₅, CH₃-triazine)−C₆H₄−N=N−C₆H₂(CH₃)₂−N=N−C₆H₄−N(CH₃)₂ | 234° C. | 487 nm |
| 6 | (4,5-dimethyl-triazine)−C₆H₂(Br)₂−N=N−C₆H₄−N=N−C₆H₄−N(CH₃)₂ | 150° C. | |
| 7 | (4,5-dimethyl-triazine)−C₆H₂(CN)₂−N=N−C₆H₄−N=N−C₆H₄−N(CH₃)₂ | 160° C. | |
| 8 | (CO₂C₂H₅, CH₃-triazine)−C₆H₄−N=N−naphthyl−N=N−C₆H₄−N(CH₃)₂ | 230° C. | 527 nm |
| 9 | (methyl-benzotriazine)−C₆H₂(CH₃)₂−N=N−C₆H₂(CH₃)₂−N=N−C₆H₄−N(CH₃)₂ | 230° C. | 483 nm |
| 10 | (methyl-benzotriazine)−C₆H₄−N=N−C₆H₂(CH₃)₂−N=N−C₆H₄−N(CH₃)₂ | 241° C. | 490 nm |
| 11 | (methyl-benzotriazine)−C₆H₃(CH₃)−N=N−C₆H₃(CH₃)−N=N−C₆H₃(CH₃)−NH₂ | 194° C. | 424 nm |
| 12 | (methyl-benzotriazine)−C₆H₃(CH₃)−N=N−C₆H₂(CH₃)₂−N=N−C₆H₄−N(C₄H₉)₂ | 123° C. | 508 nm |
| 13 | (methyl-benzotriazine)−C₆H₃(CH₃)−N=N−C₆H₃(CH₃)−N=N−C₆H₄−N(C₄H₉)₂ | 122° C. | 505 nm |

-continued

| Example | Structure | m.p. | λ max (CH₂Cl₂) |
|---|---|---|---|
| 14 | benzotriazole(H₉C₄)–N=N–(2,5-diMe-C₆H₂)–N=N–(2,5-diMe-C₆H₂)–N=N–C₆H₄–N(CH₃)₂ | 170° C. | 487 nm |
| 15 | benzotriazole(H₉C₄)–N=N–(2-Me-C₆H₃)–N=N–(2-Me-C₆H₃)–N=N–C₆H₄–N(CH₃)₂ | 156° C. | 483 nm |
| 16 | benzotriazole(H₃C)–N=N–(2-Me-C₆H₃)–N=N–(2-Me-C₆H₃)–N=N–(2-Me-C₆H₃)–O–C₄H₉ | 163° C. | 400 nm |
| 17 | benzotriazole(H₃C)–N=N–(2,5-diMe-C₆H₂)–N=N–(2-Me-C₆H₃)–N=N–(2-Me-C₆H₃)–O–CH₂–C₆H₅ | 183° C. | 400 nm |
| 18 | benzotriazole(H₃C)–N=N–(2,5-diMe-C₆H₂)–N=N–(2-Me-C₆H₃)–N=N–(2-Me-C₆H₃)–O–CH₂–C₆H₄–(cyclohexyl-C₂H₅) | 188° C. | 402 nm |
| 19 | benzotriazole(CO₂C₄H₉)–N=N–(2,5-diMe-C₆H₂)–N=N–(2-Me-C₆H₃)–N=N–C₆H₄–N(CH₃)₂ | 202° C. | 490 nm |
| 20 | benzotriazole(H₃C)–N=N–(2,5-diMe-C₆H₂)–N=N–(2-Me-C₆H₃)–N=N–C₆H₄–N(CH₃)(C₄H₉) | 158° C. | 498 nm |
| | benzotriazole(H₃C)–N=N–(2-Me-C₆H₃)–N=N–(2-Me-C₆H₃)–N=N–C₆H₄–N(R¹)(R²) | | |
| 21 | R¹ = R² = CH₃ | 192° C. | 482 nm |
| 22 | R¹ = H, R² = C₄H₉ | 130° C. | 455 nm |
| 23 | R¹ = H, R² = CH₂–C₆H₅ | 181° C. | 445 nm |
| 24 | R¹ = CH₃, R² = C₄H₉ | 149° C. | 495 nm |
| 25 | R¹ = CH₃, R² = CH₂–C₆H₅ | 156° C. | 478 nm |
| 26 | benzotriazole(H₃C)–N=N–(2-Me-C₆H₃)–N=N–(2-Me-C₆H₃)–N=N–(2-Me-C₆H₃)–N(CH₃)₂ | 203° C. | 500 nm |
| 27 | benzotriazole(C₄H₉)–N=N–(2-Me-C₆H₃)–N=N–(2-Me-C₆H₃)–N=N–(2-Me-C₆H₃)–N(CH₃)₂ | 140° C. | 496 nm |

-continued

| Example | Structure | m.p. | λ max (CH$_2$Cl$_2$) |
|---|---|---|---|
| 28 | (structure with H$_3$C-benzotriazole-N=N-aryl-N=N-aryl-N=N-aryl-N(CH$_3$)(isoC$_4$H$_9$)) | 148° C. | 508 nm |
| 29 | (structure with OCH$_3$ substituent, N(CH$_3$)(C$_4$H$_9$)) | 166° C. | 520 nm |
| 30 | (structure with H$_3$CO and OCH$_3$ substituents, N(CH$_3$)(C$_4$H$_9$)) | 169° C. | 540 nm |
| 31 | (structure with C$_4$H$_9$-benzotriazole, naphthyl-N(CH$_3$)(H)) | 162° C. | 478 nm |
| 32 | (structure with C$_4$H$_9$-benzotriazole, naphthyl-N(CH$_3$)$_2$) | 216° C. | 551 nm |

The degrees of order S and the solubilities L, both measured at room temperature in the ZLI 1840 wide-range mixture from Merck, are summarized in Table 1 for Examples 1–18. The degrees of order S and the solubilities L for Examples 19–32, measured at room temperature in the state liquid crystal mixture from Merck, are summarized in Table 3.

The degree of order S was determined in accordance with the known equation S=(CR−1)/(CR+2), using commercial measuring cells with homogeneous edge orientation. The dichroic ratio CR was determined by measuring the extinctions E∥ (measured using polarized light parallel to the preferred direction of the nematic phase) and E⊥ (measured using polarized light perpendicular to the preferred direction of the nematic phase) and using the relationship CR=E∥/E⊥ the dye concentration being chosen so that E∥ was from 1 to 2. The measurements were carried out using a Beckman Acta CIII spectrophotometer. FIG. 1 shows the extinctions E∥ and E⊥ for Example 15 in ZLI 1840.

The solubility was determined as follows: 50 mg of the particular dye were stirred into 1 ml of ZLI 1840 at room temperature for 1 week, and saturation of the soluton was determined by comparing extinction values.

TABLE 1

| Example | Degree of order S | Solubility L |
|---|---|---|
| 1 | 0,64 | |
| 2 | 0,71 | 1,4% |
| 3 | 0,74 | 0,4% |
| 4 | 0,70 | 0,7% |
| 5 | 0,73 | 0,2% |
| 6 | 0,61 | 1,8% |
| 7 | 0,74 | <0,1% |
| 8 | 0,74 | 0,5% |
| 9 | 0,76 | 0,5% |
| 10 | 0,73 | 0,6% |

TABLE 1-continued

| Example | Degree of order S | Solubility L |
|---|---|---|
| 11 | 0,75 | |
| 12 | 0,71 | 5% |
| 13 | 0,74 | >5% |
| 14 | 0,76 | >2,3% |
| 15 | 0,79 | 2,8% |
| 16 | 0,74 | 0,5% |
| 17 | 0,74 | 0,6% |
| 18 | 0,77 | 2,9% |

Figure 2:
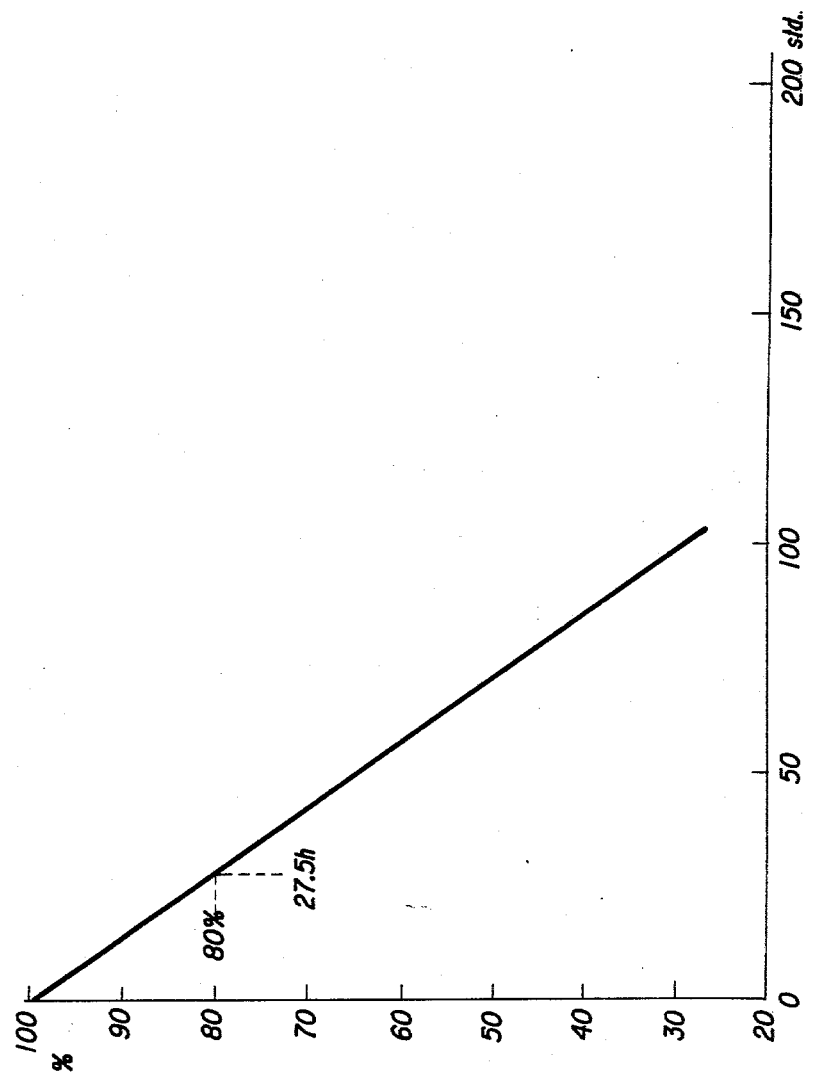
Figure 3:
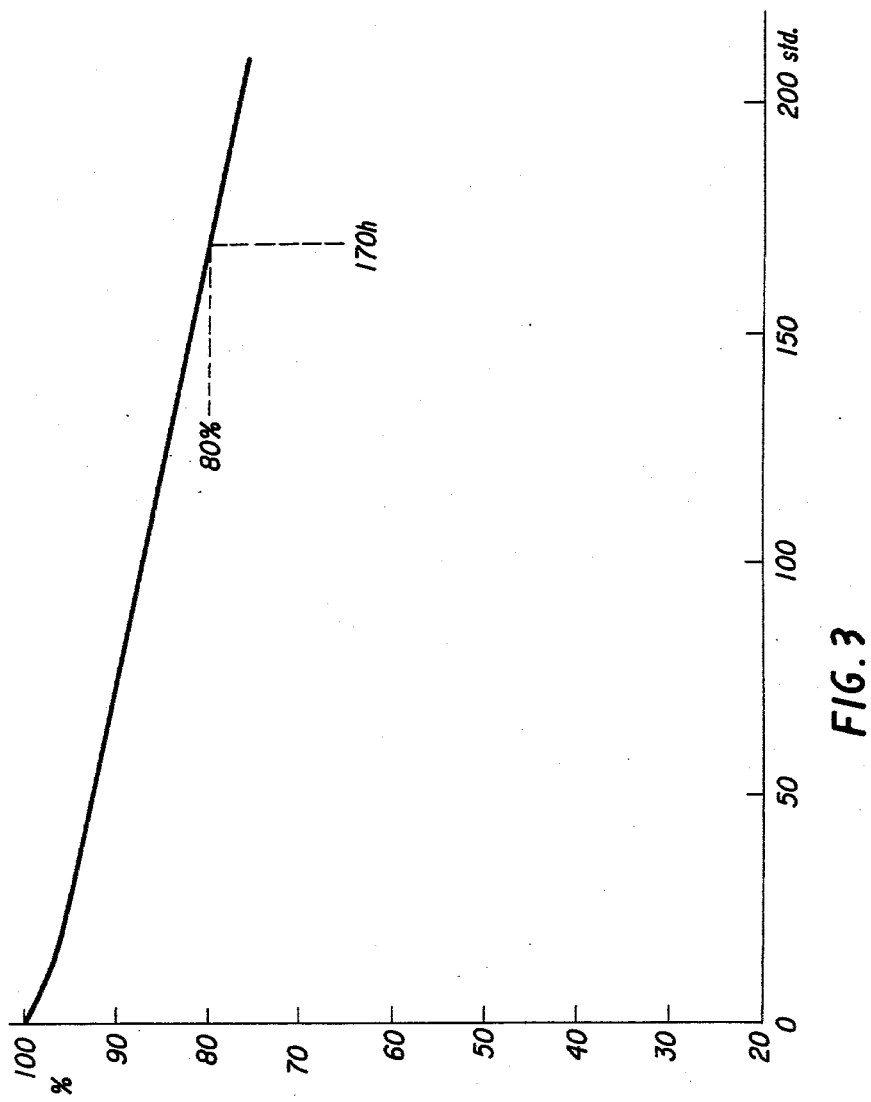
Figure 4:
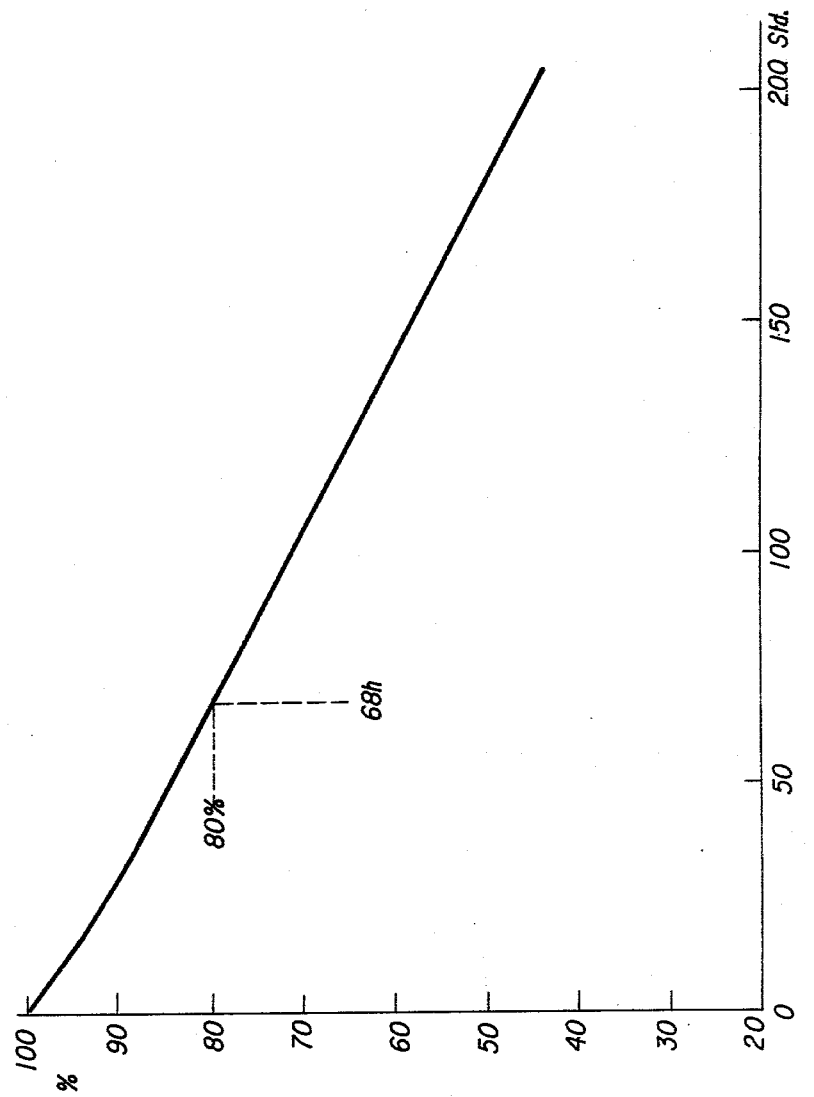

The light-stability was determined by high-speed exposure of the measuring cell in a Suntest from Hanau, at 25° C. In this procedure, the decrease in E∥ was measured. The initial extinction E∥ and the exposure time E∥$_{80\%}$ after which E∥ has decreased to 80% are shown in Table 2 for Examples 5, 8, 9, 10, 11, 12, 13, 14 and 15. The percentage change in E∥$_0$ is plotted against the exposure time in FIGS. 2, 3 and 4 for Examples 8, 11 and 15.

TABLE 2

| Example | E$_o''$ | E$_{80\%}''$ |
|---|---|---|
| 5 | 1,39 | 101 h |
| 8 | 1,16 | 27,5 h |
| 9 | 1,47 | 111 h |
| 10 | 1,88 | 147 h |
| 11 | 1,63 | 170 h |
| 12 | 1,49 | 98 h |
| 13 | 1,80 | 97 h |
| 14 | 1,57 | 111 h |
| 15 | 1,25 | 68 h |

TABLE 3

| Example | Degree of order S | Solubility L | Liquid crystal mixture |
|---|---|---|---|
| 19 | 0,76 | 0,3% | ZLI 1840 |

TABLE 3-continued

| Example | Degree of order S | Solubility L | Liquid crystal mixture |
|---|---|---|---|
| 20 | 0,74 | 2,0% | ZLI 1957/5 |
| 21 | 0,76 | 2,8% | ZLI 1840 |
| 22 | 0,77 | >5% | ZLI 1840 |
| 23 | 0,79 | 1,9% | ZLI 1840 |
| 24 | 0,77 | >5% | ZLI 1840 |
| 25 | 0,76 | 1,9% | ZLI 1840 |
| 26 | 0,76 | 2,0% | ZLI 1840 |
| 27 | 0,75 | 3,9% | ZLI 1840 |
| 28 | 0,72 | 1,5% | ZLI 1957/5 |
| 29 | 0,71 | 0,5% | ZLI 1957/5 |
| 30 | 0,67 | 0,3% | ZLI 1957/5 |
| 31 | 0,70 | 2,0% | ZLI 1840 |
| 32 | 0,65 | 0,1% | ZLI 1957/5 |

We claim:

1. An azo dye which contains triazolyl groups and is of the formula

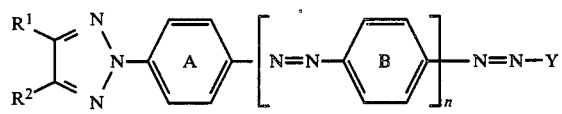    I wherein n is 1 or 2;

$R^1$ and $R^2$ together form $(C_3-C_4)$alkylene or

wherein R is hydrogen, $(C_1-C_{12})$alkyl, cyclopentyl, cyclohexyl, cycloheptyl, nitro, cyano, halogen, hydroxyl, cycloheptyl, nitro, cyano, halogen, hydroxyl, $(C_1-C_{12})$alkoxy, benzyloxy, amino, $(C_1-C_4)$dialkylamino, $(C_1-C_{12})$alkoxycarbonyl or phenyl, and m is 1 or 2; and Y is a radical of the formula

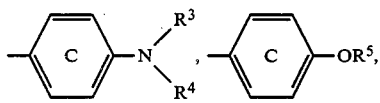

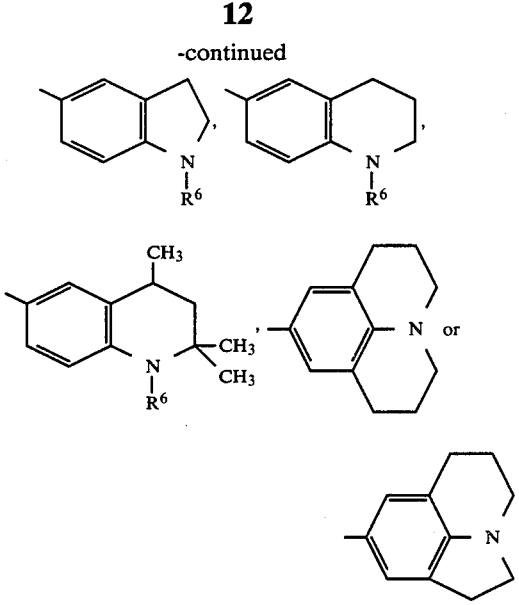

where the ring A is substituted by H, halogen, cyano, lower alkyl or lower alkoxy, and the rings B and C are substituted by H, halogen, lower alkyl, lower alkoxy, alkoxy amino or a fused phenyl ring;

$R^3$ and $R^4$ are each hydrogen, alkyl, aralkyl or cycloalkyl, or, together with the nitrogen, form piperidino, pyrrolidino or morpholino, $R^5$ is hydrogen, or alkyl, cycloalkyl, aralkyl, aryl, acetyl, propionyl, butyryl, benzoyl, alkylbenzoyl, cyclohexyl benzoyl, alkycyclohexylbenzoyl, alkoxycarbonyl, aryloxycarbonyl, alkysulfonyl or arylsulfonyl; and $R^6$ is hydrogen, alkyl or cycloalkyl.

2. A compound as claimed in claim 1, of the formula

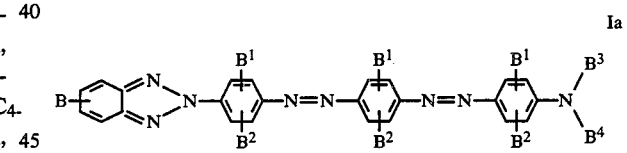    Ia where B is hydrogen, $C_1-C_4$-alkyl, cyclohexyl, $C_1-C_9$-alkoxycarbonyl, nitro or cyano, $B^1$ and $B^2$ independently of one another are each hydrogen or methyl, and $B^3$ and $B^4$ independently of one another are each hydrogen, $C_1-C_4$-alkyl, benzyl or cyclohexyl, or, together with the nitrogen, form pyrrolidino, piperidino or morpholino.

* * * * *